US005508053A

United States Patent [19]

Villota et al.

[11] Patent Number: 5,508,053

[45] Date of Patent: Apr. 16, 1996

[54] METHOD FOR PRODUCING VEGETABLE PASTA

[75] Inventors: Ricardo Villota, Lake Zurich; Richard C. Maksimoski, Gurnee; Scot A. Irvin, Grayslake, all of Ill.

[73] Assignee: Kraft Foods, Inc., Northfield, Ill.

[21] Appl. No.: 317,997

[22] Filed: Oct. 4, 1994

Related U.S. Application Data

[63] Continuation-in-part of Ser. No. 106,217, Aug. 13, 1993, abandoned.

[51] Int. Cl.[6] .......... A23L 1/16

[52] U.S. Cl. .......... 426/557; 426/451

[58] Field of Search .......... 426/557, 451

[56] References Cited

U.S. PATENT DOCUMENTS

| | | | |
|---|---|---|---|
| 466,230 | 12/1891 | Gent . | |
| 1,355,731 | 10/1920 | Bloch . | |
| 2,037,042 | 4/1936 | Perewe | 99/85 |
| 3,082,092 | 3/1963 | De Felice | 99/85 |
| 3,780,186 | 12/1973 | Troy | 426/93 |
| 3,843,818 | 12/1972 | Wren et al. | 426/346 |
| 3,992,554 | 11/1976 | Blake et la. | 426/557 |
| 4,088,790 | 5/1978 | Bevan et al. | 426/96 |
| 4,517,215 | 5/1985 | Hsu | 426/557 |
| 4,840,808 | 6/1989 | Lee et al. | 426/270 |
| 4,871,572 | 10/1989 | Chiu et al. | 426/557 |
| 4,874,619 | 10/1989 | Leonardo et al. | 426/94 |
| 5,087,470 | 2/1992 | Sarabhai | 426/557 |
| 5,124,168 | 6/1992 | McMillin et al. | 426/557 |
| 5,211,977 | 5/1993 | Hauser et al. | 426/557 |
| 5,252,351 | 10/1993 | Cox | 426/549 |
| 5,294,454 | 3/1994 | Guarneri | 426/557 |

FOREIGN PATENT DOCUMENTS

| | | | |
|---|---|---|---|
| 0350552A1 | 1/1990 | European Pat. Off. | A23L 1/16 |
| 0445550B1 | 3/1990 | European Pat. Off. | A23L 1/16 |
| 0518097A1 | 12/1992 | European Pat. Off. | A23L 1/16 |
| 0536982A2 | 4/1993 | European Pat. Off. | A23P 1/08 |
| 1729398A1 | 4/1992 | U.S.S.R. . | |

OTHER PUBLICATIONS

Database WPI Week 8533, Derwent Publications Ltd., London, GB; AN85-200230 & JP-A-60 126 043 (Showa Sangyo KK) 5 Jul. 1985—Abstract.

Giese, "Pasta: New Twist on an Old Product", *Food Technology*—Feb. 1992, pp. 118–126.

*Primary Examiner*—Donald E. Czaja
*Assistant Examiner*—Lien Tran
*Attorney, Agent, or Firm*—Fitch, Even, Tabin & Flannery

[57] ABSTRACT

A method is provided for the production of vegetable or herb pasta, especially thin-walled vegetable or herb pasta, containing high levels of vegetable solids, i.e., about 4 to about 15 weight percent vegetable solids, or high levels of herb solids, i.e., about 2 to 15 weight percent herb solids. Vegetable pasta can be prepared using vegetable solids derived from beet, broccoli, carrot, celery, corn, green pepper, red pepper, spinach, tomato, and the like. Herb pasta can be prepared using herb solids derived from oregano, basil, coriander, tarragon, onion, parsley, sage, garlic, and the like. Such vegetable and herb pastas are produced by carefully drying the formed pasta shapes under high temperature and low relative humidity conditions, whereby the vegetable or herb pasta is obtained with a moisture content of about 11 to about 13 weight percent and vegetable solids content of about 4 to about 15 weight percent or herb solids content of about 2 to about 15 weight percent, wherein the pasta has, after processing and subsequent cooking, good color, texture, integrity, and vegetable or herb flavor. The vegetable and herb pastas produced by this method also have excellent storage stability.

40 Claims, No Drawings

METHOD FOR PRODUCING VEGETABLE PASTA

RELATED APPLICATION

This application is a continuation-in-part of U.S. patent application Ser. No. 08/106,217, filed on Aug. 13, 1993 now abandoned, which is hereby incorporated by reference.

FIELD OF THE INVENTION

The present invention generally relates to methods for the production of vegetable pastas and herb pastas and to the vegetable pastas and herb pastas so produced. More specifically, this invention provides improved methods for the production of vegetable-containing or herb-containing pastas, especially thin-walled pastas, which contain high levels of vegetable solids or herb solids, respectively. The vegetable pastas and herb pastas of this invention retain good color, texture, integrity, and flavor after cooking.

BACKGROUND OF THE INVENTION

Conventional vegetable pastas, such as spinach- and tomato-containing pastas, consist mainly of wheat flour with only about 3 to 3.5 weight percent or less vegetable solids. Attempts to prepare wheat flour-based vegetable pastas with higher vegetable solids levels have generally been unsatisfactory.

Processes for the commercial manufacture of pasta, including vegetable pasta with low levels of vegetable solids, are well known. These processes involve mixing flour and water and, in the case of vegetable pasta, the appropriate vegetable solids, to form a paste. Typically the paste is shaped by forcing it through holes in an extruder die at high pressure and elevated temperature to form extrudates of the desired cross-sectional shape. The extrudates may, if desired, be cut to desired lengths. The extrudates are usually dried to a moisture content of generally less than about 14 weight percent.

The drying process in a conventional pasta manufacturing process is lengthy. The extrudates as they leave the extruder generally have a moisture content of about 28 weight percent or higher. For shelf-stable pasta, the moisture content of the pasta must generally be reduced to below about 14 weight percent. To accomplish this, conventional long and short pasta goods are generally dried to a moisture content of about 10 to 13 weight percent under normal drying conditions using temperature in the range of about 40° to about 60° C. with maximum drying times of about 10 hours for short pasta goods (i.e., elbow macaroni, elbow spaghetti, shells, mafalda, and the like) and about 20 hours for long pasta goods (i.e., spaghetti, fettuccine, vermicelli, and the like). Under high temperature drying conditions in the range of about 60° to about 80° C., short pasta goods are dried for a maximum of about 5 hours and long pasta goods are dried for a maximum of about 10 hours. For ultra high temperature drying conditions in the range of about 80° to about 140° C., short pasta goods are dried for a maximum of about 2 hours and long pasta goods are dried for a maximum of 5 hours. In most cases, the only process parameters controlled are the temperature, the relative humidity of the drying air and the drying time. In order to avoid checks, cracks, and like defects in the pasta, the conventional drying process is a relatively slow and time consuming, often requiring up to about 36 hours for long goods or 12 hours for short goods, for the pasta to reach the desired moisture content of less than 14 weight percent. During much of the drying process, the pasta is subjected to elevated temperatures which, if vegetable solids are present, adversely affect the color, flavor, texture and nutritional value of the finished pasta product.

Incorporation of flavoring and/or coloring agents, such as spinach or tomato solids, at levels up to about 3 weight percent can sometimes result in a pasta product with a starchy or gummy texture. Moreover, such vegetable pastas generally do not retain their color upon shelf aging or when cooked for eating. Better color can be obtained by increasing the level of vegetable solids in the pasta accompanied by properly controlled processing conditions. Attempts to increase the vegetable solids content above about 3.5 weight percent in dried, shelf-stable pasta have, however, generally resulted in products which lack integrity and with a tendency to fall apart during or after cooking. Such pasta also does not have desirable texture properties and generally, the overall quality is unacceptable. Thus, commercially available dried vegetable pasta generally has about 3 to 3.5 weight percent or less vegetable solids, and tends to change in color and flavor during processing, storage and upon cooking.

Some attempts have been made to preserve or enhance the color in dried vegetable pasta. For example, U.S. Pat. No. 4,840,808 discloses preparing vegetable pasta containing about 3 weight percent chlorophyll-containing vegetable solids and cations selected from the group consisting of magnesium, zinc, copper, calcium, and aluminum in order to enhance and preserve the color. The vegetable powders are subjected to an alkaline treatment prior to addition to the pasta dough in order to hydrolyze the chlorophyll ester groups and stabilize the chlorophyll pigment. U.S. Pat. No. 4,517,215 discloses the use of hydrocolloids such as sodium or potassium alginate, at about 0.25 to 3 weight percent, and propylene glycol alginates, also at about 0.25 to 3 weight percent, to prepare vegetable pastas where the main ingredient is a seed or tuberous vegetable such as corn, potato, beans, and peas. Such vegetable pastas do not contain significant amounts of wheat-type flour. European Patent Publication 0,518,097A1 discloses that the color stability of vegetable pasta can be enhanced by subjecting the fresh pasta to saturated steam at 70° to 80° C. followed by drying at temperatures below 60° C. and a relative humidity of about 75 percent to a final moisture content of about 11 percent.

As indicated, the amount of vegetable solids in conventional dried wheat-based pasta has generally been limited to about 3 to 3.5 weight percent or less. Such vegetable pastas tend to loose color and flavor during the drying process, upon storage, and especially upon cooking. For example, green or chlorophyll-containing vegetable pastas, e.g., spinach pastas tend to turn brown; and the reddish color in tomato pasta tends to fade over time. Moreover, even if the color remains strong in the dried pasta, there is generally a substantial loss of color upon cooking. A general reduction in both flavor and nutritional values is also observed with conventional vegetable pastas upon storage. The inability to incorporate higher levels of vegetable solids into dried pasta and to maintain color and flavor, has also generally limited the types of vegetables that could be utilized to those with very intense coloration or pigmentation such as spinach or tomato. In general, flavor retention has not been a primary concern in commercial vegetable pasta products.

More recently, U.S. Pat. No. 5,124,168 (June 23, 1992) provides a vegetable pasta having up to about 10 weight percent vegetable or herb solids which reportably retained enhanced flavor, color, and texture and, when dried, had a shelf life longer "than flavored pasta products currently in the market." The basic pasta product contained between about 40 to 80 percent pasta flour, about 1 to 10 percent egg (e.g., whole egg, egg white from whole egg, or dehydrated egg white), about 0.2 to 5 percent starch complexing agent, olive oil in an amount sufficient to facilitate the extrusion of the pasta product and to bind the non-pasta flour ingredients to the pasta flour (i.e., about 1 to 5 percent), and sufficient water for blending. The pasta could contain up to about 10 percent of a "flavor component" selected from the group consisting of tomato, parsley, calamari, lemon, garlic, curry, carrot, porcini, mushroom, black pepper, dill, cilantro, serrano, green pepper, red pepper, tarragon, and combinations thereof. The pasta could be used fresh or it could be dried under relatively low temperature and relatively high humidity conditions. The maximum drying temperature was between about 58° and 70° C. in order "to protect the organoleptic properties of the formulations." The reported relative humidity during drying was in the range of about 85 to 92 percent. The drying process consisted of four distinct stages: (1) an initial pre-drying stage having a preferred temperature of about 30° C. and a preferred relative humidity of about 85 percent; (2) a pre-drying stage having a preferred temperature of about 30° C. and a preferred relative humidity of about 85 percent; (3) a drying stage having several substages over a 14 to 15 hour period; and (4) a post-drying stage where the pasta is equilibrated with ambient temperature and humidity conditions. The drying stage included three separate substages: (1) a "case hardening" substage wherein the pasta product is subjected to a draft of air to set the exterior shape; (2) a high humidity substage where the humidity is raised to about 92 percent and where the temperature is raised to about 70° C., then lowered to about 55° C. and held at that temperature for about 2 hours; and (3) a final substage wherein the temperature is lowered to about 30° C. over about a twelve hour period during which time the humidity is also lowered "in proportion to the drop in temperature." The drying process should bring the moisture content of the pasta down from about 30 percent to about 12 percent in about 14 to 15 hours.

The inability to provide vegetable pastas and herb pastas with good texture, flavor, color and nutritional value as well as good storage stability has limited the use of such pastas. Fresh vegetable and herb pastas generally exhibit very limited shelf lives because of their tendency to undergo chemical changes, including flavor and color degradation.

It would be desirable, therefore, to provide a method by which dried vegetable or herb pasta could be prepared with higher levels of vegetable or herb solids than is currently commercially available. It would also be desirable to provide dried vegetable or herb pastas with high levels of vegetable or herb solids, respectively, which have good color, texture, structural integrity, and vegetable or herb flavors. It would also be desirable to provide dried vegetable or herb pastas with high levels of vegetable or herb solids, respectively, which retain their color, texture, integrity, and vegetable or herb flavor upon cooking. It would also be desirable to provide dried vegetable or herb pastas with high levels of vegetable or herb solids, respectively, which are more visually appealing, i.e., more colorful, in both the dried and cooked state and which are more flavorful and nutritious than conventional vegetable or herb pastas. It would also be desirable to provide dried vegetable or herb pastas with enhanced color and color stability without the need to add color stabilizers, enhancers, artificial coloring, or other stabilizing ingredients to the product. It would also be desirable to provide dried vegetable or herb pastas with improved storage stability. It would also be desirable to provide such just-described vegetable or herb pastas without the need to add egg-containing ingredients and/or oil. It would also be desirable to provide essentially egg-free and/or oil-free vegetable or herb pastas having high levels of vegetable or herb solids, respectively. The present invention provides such processes and such dried vegetable and herb pastas.

SUMMARY OF THE INVENTION

This invention relates to a method by which dried vegetable pasta having high levels of vegetable solids can be prepared using conventional pasta making equipment. This invention also relates to a method by which dried herb pasta having high levels of herb solids can be prepared using conventional pasta making equipment. The vegetable and herb pastas produced by this invention have improved color, texture, structural integrity, and flavor characteristics, in both the uncooked or dried state and the cooked state, as compared with dried vegetable or herb pastas currently available. An especially preferred vegetable pasta product of this invention is an essentially egg-free and/or essentially oil-free vegetable pasta product having improved color, texture, structural integrity, and flavor characteristics, in both the uncooked or dried state and the cooked state. An especially preferred herb pasta product of this invention is an essentially egg-free and/or essentially oil-free herb pasta product having improved color, texture, structural integrity, and flavor characteristics, in both the uncooked or dried state and the cooked state.

Vegetable pastas are provided which contain between about 4 to about 15 weight percent vegetable solids, preferably between about 6 and about 15 weight percent vegetable solids, and more preferably between about 6 to about 9 weight percent vegetable solids. Herb pastas are provided which contain between about 2 to 15 weight percent herb solids. When the herbs used are individually quick frozen (IQF), the herb pasta preferably contains about 2 to 5 weight percent herb solids, and more preferably about 2 to 3 weight percent herb solids. If additional herb solids are desired or needed for flavor, gently dried herbs can be added up to a maximum of about 15 weight percent herb solids. When the herbs are gently dried (e.g., freeze dried, air dried, and the like), the herb pasta preferably contains about 4 to 15 weight percent herb solids, and more preferably about 6 to 9 weight percent herb solids. The pastas of this invention may contain both vegetable and herb solids, in which case, the total amount of vegetable and herb solids should be in the range of about 4 to 15 weight percent. Preferably, the vegetable and herb pastas of this invention are essentially egg-free. Preferably, the vegetable and herb pastas of this invention are essentially oil-free. More preferably, the vegetable and herb pastas of this invention are both essentially egg-free and essentially oil-free.

The vegetable and herb pastas of this invention are prepared by first forming a homogenous aqueous paste of flour and vegetable or herb solids containing about 27 to about 33 weight percent water. The flour typically has an average minimum protein content of greater than about 12 weight percent and preferably in the range of about 12 to 13.5 weight percent. The homogenous paste is then extruded to form pasta-shaped extrudates. For purposes of this invention, the terms "pasta-shaped extrudates" or "extrudates" are intended to include both three-dimensional shapes formed with conventional extrusion techniques and dies of appropriate shape as well as thin sheets formed using conventional roller-type pasta makers and strips or other shapes cut from such thin sheets. The extrudates are dried under high temperature and low relative humidity conditions. By carefully controlling both the temperature and humidity during drying, a vegetable or herb pasta is obtained which has, both before and after cooking, good color, texture, integrity, and vegetable or herb flavor. Both egg-containing and essentially egg-free vegetable and herb pastas can be dried by the methods of this invention (i.e., relatively high temperatures and relatively low humidity conditions) with excellent results.

The dried pastas of this invention have a moisture content of about 11.0 to about 13.0 weight percent and a vegetable solids content of about 4 to about 15 weight percent or a herb solids content of about 2 to 15 weight percent. For purposes of this invention, "dried pasta" or "dried vegetable pasta" or "dried herb pasta" is pasta having a moisture content of less than about 13 weight percent and preferably less than about 12 weight percent. Vegetables suitable for incorporation into vegetable pastas prepared using the process of this invention include, but are not limited to, beets, broccoli, carrots, celery, corn, green peppers, red peppers, spinach, and tomatoes. Other vegetables may, if desired, also be employed. If desired, mixtures of vegetable solids derived from different vegetables can be used. It is also contemplated that the vegetables used may impart color without flavor and vice versa. Herbs suitable for incorporation into herb pastas prepared using the process of this invention include, but are not limited to, oregano, basil, coriander, tarragon, onion, parsley, sage, and garlic. Other herbs may, if desired, also be employed. If desired, mixtures of herb solids derived from different herbs can be used. It is also contemplated that the herbs used may impart color without flavor and vice versa. In addition, and if desired, mixtures of vegetable and herb solids can be used. The vegetable and herb pastas prepared by the process of this invention offer excellent storage stability with minimal loss of color, texture, and flavor and excellent retention of color, texture, and flavor upon processing and subsequent cooking.

One object of the present invention is to provide a method of preparing vegetable or herb pasta containing about 4 to about 15 weight percent vegetable solids or about 2 to 15 weight percent herb solids, said method comprising (1) blending flour, vegetable or herb solids, and water to form a homogenous paste with a water content of about 28 to about 33 weight percent, wherein the flour has a minimum average protein content between about 12 to about 13.5 weight percent;

(2) extruding the homogenous paste to form pasta-shaped extrudates; and (3) drying the pasta-shaped extrudates under high temperature and low relative humidity conditions, whereby a vegetable or herb pasta is obtained with a moisture content of about 11 to about 13 weight percent and vegetable solids content of about 4 to about 15 weight percent or herb solids content of about 2 to 15 weight percent, wherein the vegetable or herb pasta has, after processing and subsequent cooking, good color, texture, integrity, and vegetable or herb flavor.

Another object of the present invention is to provide an essentially egg-free vegetable or herb pasta containing about 4 to about 15 weight percent vegetable solids or about 2 to 15 weight percent herb solids, said pasta being prepared by a process comprising (1) blending flour, vegetable or herb solids, and water to form a homogenous paste with a water content of about 28 to about 33 weight percent, wherein the flour has an average protein content between about 12 to about 13.5 weight percent, wherein the vegetable solids are derived from a vegetable selected from the group consisting of beet, broccoli, carrot, celery, corn, green pepper, red pepper, spinach, and tomato, wherein the herb solids are derived from a herb selected from the group consisting of oregano, basil, coriander, tarragon, onion, parsley, sage, and garlic, and wherein the homogenous paste is essentially egg-free;

(2) extruding the homogenous paste to form pasta-shaped extrudates; and (3) drying the pasta-shaped extrudates under high temperature and low relative humidity conditions whereby an essentially egg-free vegetable or herb pasta is obtained with a moisture content of about 11 to about 13 weight percent and vegetable solids content of about 4 to about 15 weight percent or herb solids content of about 2 to 15 weight percent, wherein the essentially egg-free vegetable or herb pasta has, after processing and subsequent cooking, good color, texture, integrity, and vegetable or herb flavor.

Still another object of this invention is to provide a method of preparing a thin-walled vegetable or herb pasta containing about 4 to about 15 weight percent vegetable solids or about 2 to 15 weight percent herb solids, said method comprising (1) blending flour, vegetable or herb solids, and water to form a homogenous paste with a water content of about 28 to about 33 weight percent, wherein the flour is a blend of about 0 to about 100 weight percent durum flour, about 0 to about 100 weight percent semolina flour, and about 0 to about 100 weight percent hard red spring flour and has a minimum average protein content between about 12 to about 13.5 weight percent and wherein the vegetable solids are derived from a vegetable selected from the group consisting of beet, broccoli, carrot, celery, corn, green pepper, red pepper, spinach, and tomato or wherein the herb solids are derived from a herb selected from the group consisting of oregano, basil, coriander, tarragon, onion, parsley, sage, and garlic;

(2) extruding the homogenous paste to form thin-walled, pasta-shaped extrudates; and (3) drying the thin-walled, pasta-shaped extrudates under high temperature and low relative humidity conditions, wherein (a) the thin-walled, pasta-shaped extrudates is first dried at a temperature of about 65° to about 85° C. and a relative humidity of about 25 to about 60 percent for a time sufficient to form a first partially-dried, thin-walled vegetable or herb pasta with a moisture content of less than about 27 weight percent, (b) the first partially-dried, thin-walled vegetable or herb pasta is then dried at a temperature of about 75° to about 115° C. and a relative humidity of about 26 to about 60 percent for a time sufficient to form a second partially-dried, thin-walled vegetable or herb pasta with a moisture content of less than about 19.0 weight percent, and (c) the second partially-dried, thin-walled vegetable or herb pasta is dried at a temperature of about 70° to about 98° C. and a relative humidity of about 35 to about 60 percent for a time sufficient to form a thin-walled vegetable or herb pasta with a moisture content of about 11 to about 13 weight percent and vegetable solids content of about 4 to about 15 weight percent or herb solids content of about 2 to about 15 weight percent, wherein the thin-walled vegetable or herb pasta has, after cooking, good color, texture, integrity, and vegetable or herb flavor.

These and other objects and advantages of the present invention will become apparent through the following description of the preferred embodiments of the invention.

DESCRIPTION OF THE PREFERRED EMBODIMENTS

The present invention relates to a method of producing vegetable or herb pastas with high levels of vegetable or herb solids and to such vegetable or herb pastas. Generally, the amount of vegetable solids is in the range of about 4 to about 15 weight percent of the dried pasta containing between about 11 to about 13 weight percent water. Preferably the vegetable solids are between about 6 to about 9 weight percent of the dried pasta. Typical vegetables suitable for incorporation into the pasta of this invention include beet, broccoli, carrot, celery, corn, green pepper, red pepper, spinach, and tomato; but, as indicated, other vegetables may be utilized if desired. Generally, the amount of herb solids is in the range of about 2 to about 15 weight percent of the dried pasta containing between about 11 to about 13 weight percent water. For IQF herbs, preferably the herb solids are between about 2 to about 5 weight percent of the dried pasta, and more preferably about 2 to 3 weight percent of the dried pasta. For gently-dried herbs, preferably the herb solids are between about 4 to about 15 weight percent of the dried pasta, and more preferably about 6 to about 9 weight percent of the dried pasta. Typical herbs suitable for incorporation into the pasta of this invention include oregano, basil, coriander, tarragon, onion, parsley, sage, and garlic; but, as indicated, other herbs may be utilized if desired.

In the first step of the present process, flour, vegetable or herb solids, and water are blended together to form a homogenous mixture or paste with a moisture content of about 28 to about 33 weight percent. When using IQF herbs, the herbs are preferably rapidly thawed just prior to the blending step to form an aqueous slurry. Preferably the moisture content of the paste is about 29 to about 32 weight percent. Conventional pasta mixers can be used for this blending step. The paste should be homogenous in order to produce a consistent and uniform pasta product. It is generally preferred that the homogenous mixture or paste is essentially egg-free. For purposes of this invention, "essentially egg-free" means that the vegetable or herb pasta contains less than about 0.1 weight percent egg products (e.g., whole egg, egg white from whole egg, or dehydrated egg white) or, more preferably, no egg products. It is also generally preferred that the homogenous mixture or paste is essentially oil-free. For purposes of this invention, "essentially oil-free" means that the vegetable or herb pasta contains less than about 0.1 weight percent added oil (e.g., olive oil) or, more preferably, no added oil. More preferably, the homogenous mixture or paste is both essentially egg-free and essentially oil-free.

High quality, wheat-based flours with mixograph values above 6 and a falling number targeted at about 400 (at least 350 minimum) are preferred in the practice of this invention. Mixograph values are a measure of gluten strength. Values of about 1 to 3 correspond to weak gluten and about 5 to 8 correspond to strong gluten. The falling number correlates with alpha amylase activity and is a good indicator of sprout damage. High alpha amylase activity in pasta products increases cooking losses. Higher amounts of reducing sugars in the raw flours and in the final product will result in softer textural characteristics in the cooked product. The flour should be of the glutinous type and have a minimum average protein content of about 12 to about 13.5 weight percent and preferably a minimum average protein content of about 13 to about 13.5 weight percent. Preferred wheat-based flours comprise 100 percent durum flours, 100 percent semolina flours, blends of about 50 to about 100 parts by weight durum flour and 0 to about 50 parts by weight hard red spring flour, and blends of about 50 to about 100 parts by weight semolina flour and 0 to about 50 parts by weight hard red spring flour. Limited amounts of proteinaceous materials such as egg albumin or soy isolates can be incorporated into the blend to modify textural properties if desired. Especially preferred wheat-based flours include 100 percent durum flours, 100 percent semolina flours, blends of about 50 to 100 weight percent durum flour and 0 to about 50 weight percent hard red spring flour, and blends of about 50 to 100 weight percent semolina flour and 0 to about 50 weight percent hard red spring flour, wherein the flour or flour blend has a minimum average protein content between about 13 to about 13.5 weight percent. Generally flours having a granulation size such that about 98 percent minimum pass through a U.S. standard No. 70 sieve are acceptable.

Sufficient vegetable or herb solids and water are added to, and blended with, the flour using conventional pasta-making equipment or mixers to produce a paste of the desired water and vegetable or herb solids content. The water content of the paste should be adjusted to allow for the formation of suitable extrudates which will retain the desired shape until that shape is set or hardened in the initial portion of the drying process. Generally, water levels in the range of about 28 to about 33 weight percent are acceptable. The vegetable solids may be in the form of a powder or an aqueous slurry. When using an aqueous slurry, a portion of the required water to form the homogenous paste will come from the aqueous slurry medium. The herb solids may be individually quick frozen (IQF) or gently-dried herbs. When using IQF herbs, a portion of the required water to form the homogenous paste will be derived from the water contained in the IQF herbs. When using IQF herbs, if additional herb solids are desired or needed for flavor, gently-dried herbs can also be added up to a maximum of about 15 weight percent herb solids. For vegetable pastas, the amount of vegetable solids added should be adjusted so that the final dried pasta has a vegetable solids content in the range of about 4 to about 15 weight percent based on the combined weight of the flour and vegetable solids. For herb pastas, the amount of herb solids should be adjusted so that the final dried pasta has a herb solids content in the range of about 2 to about 15 weight percent based on the combined weight of the flour and herb solids.

The vegetable solids can be prepared from the appropriate vegetables using conventional techniques. For example, vegetable solids are preferably prepared by spray drying slurries of the vegetable materials. For the cases of tomato and beet powders, which are characterized by a thermoplastic behavior due to their high sugar content, the use of powders produced by spray drying in tall cooling towers is preferred. Such a process would ensure good quality in the vegetable powders from the point of view of color, flavor and nutrient retention. Vegetable powders obtained by air drying, followed by grinding are acceptable, depending on color and flavor characteristics. Although vegetable powders obtained by freeze drying are excellent in quality, their high cost may limit their utilization in commercial applications. Powders containing flow conditioners or glidants may facilitate transport (feeding) operations during the pasta making operations. Glidants such as precipitated silicas may have a slightly detrimental effect on textural properties due to their interaction with the protein fraction of the flour. Incorporation of encapsulating materials with controlled water solubility such as proteins, native or modified starches or hydrocolloids, during the spray drying operation, will help in retaining color, flavor and nutrients during drying of the vegetable slurries, during the pasta making operations and during cooking. Suitable vegetables include beets, broccoli, carrots, celery, corn, green peppers, red peppers, spinach, and tomatoes. Green pepper, red peppers, broccoli and tomato are especially preferred. Generally vegetable solids having an average particle size in the range of about 5 percent maximum on U.S. standard No. 60 screen to about a minimum of about 95 through a U.S. standard No. 14 screen are acceptable. As noted, the vegetable solids may be added as a powder or as an aqueous slurry. Introduction of the vegetable solids as a powder may facilitate metering of the various streams in conventional pasta manufacturing installations and allow easier stockpiling of the vegetable product for use in the pasta manufacturing process. On the other hand, the use of aqueous slurries will generally allow the avoidance of exposure of the vegetable solids to the thermal treatment required to dry the vegetable solids and will often result in a product with better flavor, color and nutritional value. The use of a slurry may also reduce the overall manufacturing cost since the dehydration process for preparing the vegetable solids can be eliminated. When using vegetable solids above about 6 percent, slurries may be too viscous for pumping or may prevent proper flour hydration. In such cases, remaining vegetable solids need to be introduced as powders.

The herb solids can be prepared from the appropriate herbs using conventional techniques. For example, herb solids may be prepared by individually quick frozen (IQF) techniques or by conventional gently-drying techniques. Examples of such gently-drying techniques include freeze drying, spray drying slurries of the herb materials (especially in tall cooling towers), air drying, and the like. Powders containing flow conditioners or glidants may facilitate transport (feeding) operations during the pasta making operations. Glidants such as precipitated silicas may have a slightly detrimental effect on textural properties due to their interaction with the protein fraction of the flour. Incorporation of encapsulating materials with controlled water solubility such as proteins, native or modified starches or hydrocolloids, during the spray drying operation, will help in retaining color, flavor and nutrients during drying of the herb slurries, during the pasta making operations and during cooking. Suitable herbs include oregano, basil, coriander, tarragon, onion, parsley, sage, and garlic. Generally herb solids having an average particle size in the range of about 5 percent maximum on U.S. standard No. 60 screen to about a minimum of about 95 through a U.S. standard No. 14 screen are acceptable. As noted, the herb solids may be added in the form of a gently-dried powder or a slurry from an IQF material. When using IQF herbs, the herbs are preferably thawed rapidly just prior to the pasta-making procedure by adding adequate water with strong mixing to form a slurry with the appropriate solids content. The resulting thawed herbs are then added in the form of an aqueous slurry. Generally, herb pastas prepared using IQF herbs have improved color and flavor retention as compared to herb pastas prepared using gently-dried herbs. When using IQF herbs, the herb solid content of the dried pasta is generally in the range of about 2 to 5 weight percent, and preferably about 2 to 3 weight percent. When using gently-dried herbs, the herb solid content of the dried pasta is generally in the range of about 4 to 15 weight percent, and preferably about 6 to 9 weight percent. Mixtures of IQF and gently-dried herbs may also be used if desired to achieve good flavor and/or color intensity. When using IQF herbs or other slurried forms, slurries containing more than about 8 weight percent solids may prevent proper flour hydration. In such cases, remaining herb solids, if desired, should be introduced in the form of a gently-dried powder.

Other additives or ingredients may also, if desired, be added to the paste. Such additives include pH modifiers such as food-grade hydrochloric acid, sodium, hydroxide, and the like; salt or other spices; disodium phosphate; glyceryl monostearate; egg white powder; wheat gluten; whey solids; soy protein isolates; and encapsulated vitamins. Such additives can be used to enhance the flavor or nutritional value of the pasta or to provide improved physical properties for the paste such as reduced viscosity or improved lubrication to assist in the extrusion process. Generally, additives, such as extrusion aids, pH modifiers, and encapsulated vitamins, will be present at relatively low levels, i.e., less than about 2 weight percent and preferably less than about 1.5 weight percent, based on the total weight of the dried pasta. Protein-containing materials such as soy protein isolates and egg whites may be added up to a level of about 10 percent.

For chlorophyll-containing vegetables (e.g., broccoli, celery, green pepper, spinach, and the like) or chlorophyll-containing herbs (e.g., basil, oregano, coriander, and the like), it may be desirable to adjust the pH of the homogenous paste to a value of about 5 to about 9 and preferably about 6 to about 8 prior to extrusion. For carotenoid-containing vegetables such as carrots and tomato and betalain-containing vegetables such as beets, a pH in the range of about 4 to about 7 pH units may be preferred. Paste containing vegetable or herb solids outside these pH ranges may also be used; in other words, although it may be preferable to adjust the pH with specific vegetables and herbs, it is not necessary.

Once the homogenous paste is formed, the paste is extruded or otherwise shaped using conventional pasta making techniques. For example, the homogenous paste can be forced through the holes of an extruder die or can be pressed between rollers to obtained the desired shape. Extrudates formed using an extruder die can be cut to the desired length. Extrudates formed using rollers will be in the form of thin sheets which can then be cut into thin strips and to length before further processing. All conventional pasta shapes can be used in the practice of this invention including, for example, spaghetti, vermicelli, fettucini, linguine, ziti, elbow spaghetti, orqu, shell, elbow macaroni, rigatoni, macaroni, twist rings, mafalda, alphabets, lasagna, spirals, manicotti, angel hair, noodles, kid's shapes such as teddy bears and the like. Thin-wall extrudates or pasta shapes are, however, especially preferred since they generally require shorter drying times. For purposes of this invention, "thin wall" means a wall thickness of less than about 0.035 inches, preferably in the range of about 0.014 inches to about 0.031 inches.

Once formed, the pasta-shaped extrudates of this invention are dried under controlled conditions using high temperature and low relative humidity to produce a dried pasta with a moisture content of about 11 to about 13 weight percent and preferably about 12 to about 12.5 weight percent and which has good color, texture, and integrity. For purposes of this invention, "low relative humidity" is intended to mean a relative humidity in the range of about 25 to about 65 percent during the peak drying period, preferably in the range of about 25 to about 60 percent, and more preferably in the range of about 25 to 50 percent. For purposes of this invention, the "peak drying period" is that portion of the drying profile wherein the majority of the drying takes place; normally the peak drying period includes the initial and middle portion of the drying profile (i.e., at elevated temperatures) but generally does not include the final cool down portion at the end of the drying profile. It is important that the extrudates to be dried have an initial moisture content of at least 28 weight percent and preferably about 29 to about 33 weight percent. If the initial moisture content is too low, i.e., less than 28 weight percent, or if the relative humidity is too low, i.e., less than about 25 percent, it may be difficult to avoid significant structural damage to the final product during drying. By controlling the drying conditions, a good quality pasta can be produced without significant deterioration or destruction of the color, flavor, and nutrients associated with the vegetable or herb used to prepare the pasta. The drying profiles used in this invention are designed to allow for controlled and rapid removal of the water from the pasta with minimal structural stresses to prevent or minimize cracking, checking, splitting, and blistering of the pasta shapes. The present drying process generally limits the duration of the exposure of the vegetable or herb pasta to elevated temperatures while still providing a relatively crack-, check-, split-, blister-, and structural stress-free pasta product. It is generally preferred that the total time the vegetable or herb pasta be exposed to temperatures in excess of about 75° C. during the drying process is less than about 4.5 hours and more preferably less than about 3.5 hours. As noted above, thin-walled pasta is especially preferred for the practice of this invention since such pasta can generally be dried significantly faster than thick-walled pasta. Generally the drying processes described herein can be used for drying both egg-containing and essentially egg-free pasta products as described herein. These drying processes are especially adapted and suitable for preparing essentially egg-free, dried pasta products.

One preferred drying profile involves (a) drying the pasta-shaped extrudates at a temperature of about 65° to about 85° C. and a relative humidity of about 25 to about 60 percent for a time sufficient to form a partially-dried vegetable or herb pasta with a moisture content of less than about 27 weight percent, and (b) drying the partially-dried vegetable or herb pasta at a temperature of about 75° to about 115° C. and a relative humidity of about 26 to about 60 percent for a time sufficient to dry the vegetable or herb pasta. Another preferred drying profile involves (a) drying the pasta-shaped at a temperature of about 65° to about 85° C. and a relative humidity of about 25 to about 60 percent for a time sufficient to form a first partially-dried vegetable or herb pasta with a moisture content of less than about 27 weight percent, (b) drying the first partially-dried vegetable or herb pasta at a temperature of about 75° to about 115° C. and a relative humidity of about 26 to about 60 percent for a time sufficient to form a second partially-dried vegetable or herb pasta with a moisture content of less than about 19.0 weight percent, and (c) drying the second partially-dried vegetable or herb pasta at a temperature of about 70° to about 98° C. and a relative humidity of about 35 to about 60 percent for a time sufficient to dry the vegetable or herb pasta. Drying profiles having more than three discrete steps can also be used and may, in some cases, be preferred. A cooling section with temperatures of about 25° to 30° C. can be used to temper the product.

Preferably the drying regime involves first drying at a temperature of about 60° to about 70° C. for a relatively short time, i.e., about 5 to about 30 minutes, to set the shape of the extrudates, followed by drying at a higher temperature of about 70° to about 80° C. for about 15 to about 60 minutes, followed by drying at a lower temperature of about 65° to about 75° C. for about 60 to about 215 minutes, and finally drying at about ambient temperature for about 30 to about 120 minutes, while maintaining the relative humidity throughout the drying process in the range of about 25 to about 60 percent and preferably in the range of about 25 to about 50 percent. For example, the drying profiles included in the following Tables I, II, and III have been found to be satisfactory for a thin-walled pasta containing about 6 weight percent vegetable or herb solids. Additionally, based on both pilot plant and commercial operations for a vegetable pasta, a preferred drying profile is shown in Table III.

TABLE I

Typical Drying Profile

| Segment | Time (min.) | Temperature (°C.) | Relative Humidity (%) |
|---|---|---|---|
| 1 | 15 | 80–85 | 25–30 |
| 2 | 30 | 110–120 | 25–30 |
| 3 | 45 | 95–100 | 30–40 |
| 4 | 60 | 85–90 | 25–35 |
| 5 | 90 | 25–30 | 25–30 |

TABLE II

Typical Drying Profile

| Segment | Time (min.) | Temperature (°C.) | Relative Humidity (%) |
|---|---|---|---|
| 1 | 10 | 60–70 | 50–70 |
| 2 | 35 | 70–80 | 40–60 |
| 3 | 215 | 65–75 | 40–60 |
| 4 | 35 | 30–40 | 70–80 |
| 5 | 45 | 25–30 | 45–50 |

TABLE III

A Preferred Drying Profile

| Segment | Time (min.) | Temperature (°C.) | Relative Humidity (%) |
|---|---|---|---|
| 1 | 1 | 25 | 50 |
| 2 | 9 | 74 | 60 |
| 3 | 35 | 68 | 60 |
| 4 | 215 | 74 | 51 |
| 5 | 35 | 36 | 80 |
| 6 | 45 | 25 | 50 |

Of course, the drying profiles included in Tables I–III are intended only as examples of suitable drying profiles. Many other time, temperature, and relative humidity combinations can be used so long the vegetable or herb pasta is exposed to high temperatures of about 70° to about 115° C. with a residence time depending on air temperature during the early portion of the drying cycle, the relative humidity remains about 40 to about 60 percent during the drying cycle, the final moisture content of the dried pasta is in the range of about 11 to about 13 weight percent, and the resulting dried pasta has good color, texture, integrity, and flavor. Moreover, a those skilled in the art will realize, preferred drying profiles within these ranges can vary with other operational parameters including, for example, scale of the manufacturing facility and actual equipment used. Instead of having discrete temperature steps, i.e., step functions, as suggested in the Tables above, the temperature and relative humidity can also be varied in a more "continuous" manner. For example, a continuous profile similar to the step profile in Table I might consist of slowly and continuously raising the temperature from about 80° C. to about 120° C. over about 15 minutes, holding at about 120° C. for about 30 minutes, slowly and continuously lowering the temperature to about 90° C. over about 60 minutes, and then slowly and continuously lowering the temperature to ambient temperature (about 25° C.) over about 90 minutes.

As noted above, the process of this invention can be implemented using conventional pasta making equipment, including convention pasta drying ovens. The drying ovens must, of course, be capable of controlling the temperature and relative humidity to which the pasta shapes are exposed as a function of time. Generally, forced air drying ovens with discrete or separate drying zones and separate temperature and humidity controls for each drying zone are preferred. Separate drying zones allow the temperature and relative humidity to be easily varied and controlled as the pasta passes through the drying oven. Continuous, multi-conveyor belt type dryers where the pasta shapes drop from one belt to another are especially suited for the practice of this invention; the temperature and relative humidity can be controlled such that the pasta on each belt can be exposed to the desired temperature and humidity conditions. Separate drying ovens connected in series, where each oven has its own separate temperature and relative humidity controller, are generally preferred. Preferably the drying oven or ovens are forced air types which allows for better control of the humidity near the surface of the pasta shapes. Especially in the early stages of the drying process, water vapor removed from the pasta can raise the relative humidity near the pasta surface to levels higher than desired, thereby slowing down the drying process and resulting in a less desirable product. By removing this potential "layer" of high humidity near the pasta surface, the humidity can be controlled with the ranges desired in the present process. High capacity lines (in the range of 6000 lbs/hr or above) may result in problems in controlling the percentage of relative humidity in the pre-dryer. Accurate temperature and percent relative humidity must be controlled in the predryer to assure good quality in terms of color, flavor, nutrients, and structural integrity.

The vegetable and herb pastas of this invention have good color, texture, integrity, and flavor both before and after cooking. The pastas of this invention also have excellent storage stability. For example, vegetable pasta produced by this invention has a storage stability greater than nine months if protected from light; the good color, texture, integrity, and vegetable flavor both before and after cooking is not significantly reduced upon such storage. Storage stability can be increased even further if, in addition to protection from light, the pasta is protected from oxygen by, for example, packaging in an inert atmosphere such as nitrogen, or from high relative humidities. Protective packaging to minimize light and oxygen contact will be preferred if storage is expected to be at high relative humidities and high temperatures.

The following examples are provided to illustrate the invention and not to limit the invention.

Example 1. This example illustrates the manufacture of a vegetable pasta with various types of wheat flours using the process of this invention. Samples containing 6 weight percent tomato solids with 100 percent durum, 100 percent hard red spring (HRS), or blends of the aforementioned flours were evaluated for process performance and product quality. The data relating to texture and color are provided in Table IV. No significant difference was observed in the process performance of the various mixes. Generally, samples prepared with 100 percent durum flours were superior in overall acceptability and had better color and texture. The other samples were, however, acceptable. Thus, the durum flours, probably because of the type of proteins they contain, are generally preferred for the manufacturing of vegetable pasta.

TABLE IV

| | Variation of Flour Type | | | | |
|---|---|---|---|---|---|
| | Texture | | | | |
| | Work | Break Strength | Color | | |
| Flour | (lb-cm/g) | (lb/g) | L | a | b |
| durum | 3.93 | 72 | 32.31 | 16.55 | 28.42 |
| 50/50 durum/HRS | 3.42 | 62 | 29.33 | 15.40 | 32.89 |
| HRS | 3.46 | 65 | 24.49 | 12.90 | 19.50 |

Texture measurements in the above Table were determined using a FTC Texture Test System. Color parameters were determined with a Minolta Colorimeter: L is a measurement of the white-gray color component (lightness); a is a measurement of the yellow-blue component (chromaticity); and b is a measurement of the red-green component (chromaticity).

Example 2. This example illustrates the use of high vegetable solids in the successful manufacture of vegetable pasta. The process performance and final quality of samples prepared with various levels of tomato solids ranging from 3 to 15 weight percent (dry basis) and 100 percent durum flour were evaluated. Variation in final moisture content upon extrusion was observed in samples as a function of the level of solids added. Results, as indicated in Table V below, indicate that upon an increase in tomato solids concentration, the textural properties declined in acceptability, while color and flavor increased in intensity. All samples were found to be acceptable, however. A maximum in desired flavor intensity was found to be around 9 to 12 weight percent vegetable solids for products undergoing conventional cooking. Much better flavor retention was observed in products that were microwaved for an equivalent degree of cooking.

TABLE V

| | Variation of Vegetable Content | | | | |
|---|---|---|---|---|---|
| | Texture | | | | |
| Tomato Solids | Work | Break Strength | Color | | |
| (%) | (lb-cm/g) | (lb/g) | L | a | b |
| 0 | 3.93 | 72 | 45.90 | −2.78 | 30.97 |
| 6 | 3.43 | 63 | 35.41 | 17.83 | 28.25 |
| 12 | 3.19 | 57 | 26.04 | 15.82 | 18.89 |
| 15 | 2.91 | 54 | 27.92 | 16.97 | 19.28 |

Color parameters were determined with a Minolta Colorimeter: L is a measurement of the white-gray color component (lightness); a is a measurement of the yellow-blue component (chromaticity); and b is a measurement of the red-green component (chromaticity). Texture was determined using a FTC Texture Test System.

Example 3. This example illustrates that pH adjustment did not significantly modify the green color of vegetable pasta containing broccoli. The pH of the pasta has been reported to have a significant effect on chlorophyll stability. Using broccoli pasta with pH in the range of from 5.0 to 9.0, it was found that the water and temperature parameters during the drying cycle were more important, as measured by product quality, than the pH. Generally, however, a brighter green color was obtained at pH 7.8. The pH had little effect on textural properties. As far as mouthfeel and overall acceptability, pH had little effect; all samples were acceptable.

TABLE VI

| | | Variation of pH | | | |
|---|---|---|---|---|---|
| | | Texture Break Strength | Color | | |
| Blend | pH | (lb/g) | L | a | b |
| durum | — | 44.44 | 45.90 | −2.78 | 30.97 |
| durum + 6% broccoli | 5.0 | 48.25 | 26.87 | −3.37 | 19.60 |
| durum + 6% broccoli | 7.8 | 49.28 | 30.32 | −3.54 | 20.67 |
| durum + 6% broccoli | 9.0 | 49.65 | 28.25 | −3.10 | 19.57 |

Texture measurements in the above Table were determined using an Instron Universal Machine. Color parameters were determined with a Minolta Colorimeter: L is a measurement of the white-gray color component (lightness); a is a measurement of the yellow-blue component (chromaticity); and b is a measurement of the red-green component (chromaticity).

Example 4. An experimental design was conducted in a pilot plant to evaluate the influence of the several experimental variables on tomato pasta quality. The experimental design used was the Taguchi design as described in "Introduction to Quality Engineering" (America Supplier Institute, Dearborn, Michigan; Version 2.2; 1992). This experimental design allowed the evaluation of eight experimental variables and three levels for each variable. The experimental variables and their levels are shown in Table VII. Dependent variables measured included texture (as measured on an Instron Universal Machine), color (as measured with a Hunter Colorimeter), and amount of solids lost upon cooking.

TABLE VII

| Experimental Variables | | | |
|---|---|---|---|
| Experimental | Experimental Value | | |
| Variables | Level 1 | Level 2 | Level 3 |
| Addition of Vegetable Solids | Powder | Slurry | — |
| Solids Added (%) | 3.0 | 6.0 | 9.0 |
| Flour Type (% durum/% HRS) | 100/0 | 75/25 | 50/50 |
| Water Setting | 2.8 | 3.2 | 3.6 |
| Peak Dryer Temp. (Dry Bulb, °C.) | 72 | 86 | 100 |
| Relative Humidity (%) at Peak Temp. | 26 | 30 | 34 |
| Dry Blend Time (minutes) | 15 | 45 | 120 |
| pH | 5.0 | 6.0 | 7.0 |

The results of the experimental design suggest, at least within the ranges of independent variable examined, that:

(1) Process water level is significant in controlling the textural properties of the final product. Moisture level of the pasta prior to drying is also important relative to the structural stresses in the dry pasta. The form in which the vegetable solids are added (i.e., powder or slurry) and the dry bulb temperature of the air influence the texture of the cooked product to a lesser degree.

(2) Vegetable solids level, type of flour, and water levels used in the manufacturing of the pasta are important variables relative to the amount of solids lost during cooking. Generally, better results are obtained when 100 percent durum flour is utilized.

(3) Important variables which influence color are level of vegetable solids, form in which the vegetable solids are added (i.e., powder or slurry), and water setting.

Based on results of the experimental design, a "paper champion"—i.e., the values of the variables providing the best overall product within the criteria of the Taguchi design—was determined. The values for each variable for the "paper champion" are provided in the following Table VIII. It is expected that a product manufactured using these composition and process parameters would have a good to excellent quality profile. As those skilled in the art will realize, the optimum values for any of these parameters may depend, at least to some extent, on the exact equipment used and the scale of the manufacturing operation.

TABLE VIII

| Overall Results -- "Paper Champion" | |
|---|---|
| Experimental Variables | "Paper Champion" |
| Addition of Vegetable Solids | Powder |
| Solids Added (%) | 6.0 |
| Flour Type (% durum/ % HRS) | 75/25 |
| Water Setting | high |
| Peak Dryer Temp. (Dry Bulb, °C.) | 100 |
| Relative Humidity (%) at Peak Temp. | 34 |
| Dry Blend Time (minutes) | 120 |
| pH | 7.0 |

Example 5. Under controlled manufacturing conditions, initial moisture content as well as humidity and temperature in the predryers can affect the color of chlorophyll-containing vegetable and herb pastas prepared using durum flours, semolina flours, hard red spring flours, and blends thereof. Accurate control of the temperature and humidity conditions in the predryer appears to be influential factors on product quality, particularly color. Conditions in the final dryer had reduced influence on color retention, due to the lower moisture content of the product. Since humidity control is not normally effected in the shaker, initial moisture content of the pasta can be more important during this operation. Final moisture content of the material coming out of the shaker has a significant effect on color retention in the final product, since it determines the reactivity of the material entering the predryer. Plant trials conducted under a variety of process conditions for the drying cycle suggest, particularly for the case of chlorophyll-containing products, that the combination temperature/relative humidity is important for color retention during drying. Chlorophyll degradation and conversion to brown pigments (pheophytins) occurs at high moisture contents and high temperatures. Thus, drying profiles that would allow the rapid dehydration of the pasta without creating significant structural stress are expected, based on this invention, to result in a good quality product without the addition of additives to prevent such product defects.

Example 6. Experiments conducted on vegetable and herb pasta of different shapes (i.e., elbows, elbow spaghetti, fettuccine, mafalda, kid's shapes such as Christmas shapes, etc.) and thicknesses (conventional and thin wall), generally indicated that better color retention was obtained with thin-walled pastas independent of the actual shape. Conventional thickness pasta, however, gave acceptable results. Color and flavor retention upon cooking was also improved when using thin-walled products, probably because of the decreased time required for cooking. Generally, better cooked properties (e.g., color and flavor) were obtained when the pastas were microwaved, as opposed to conventional cooking.

Example 7. This example illustrates the preparation of several basil fettuccines wherein the pH, solids content, and form of added basil were varied. The basil added included IQF basil, freeze-dried basil, and mixtures of IQF and freeze-dried basil. The appropriate basil-containing slurries were prepared in a Breddo mixture and then added to the pasta mixture (prepared with durum flour) at the preconditioner point of the pasta manufacturing line. The amounts of water and basil (IQF and/or freeze-dried) used to prepare the slurries were adjusted to provide the desired herb solids content and a residual moisture content of the formed pasta of about 30 to 32 weight percent. The formed pasta was then dried to a final moisture content of about 11 to 13 weight percent using the relatively high temperature and relatively low humidity drying profile of Table IX. The total drying time was about 5.7 hours. The peak drying period (generally segments 1–12 with a total duration of about 4.3 hours) was at a temperature of up to about 74° C. and a relative humidity of about 50 to 62 percent. During segments 1–5, the temperature was raised to the peak temperature levels while maintaining the humidity at about 50 percent. Segments 6–12 (total time of 4 hours) essentially represent a plateau wherein the temperature was in the range of about 68° to 74° C. and the relative humidity was about 50 to 62 percent; this period likely accounts for most of the drying. Finally, during segments 13–20, the pasta was allowed to cool to ambient levels.

TABLE IX

Drying Profile for Basil Fettuccines

| Segment | Time (min.) | Temperature (°C.) | Relative Humidity (%) |
|---|---|---|---|
| 1 | 1 | 25 | 50 |
| 2 | 6 | 35 | 50 |
| 3 | 6 | 45 | 50 |
| 4 | 6 | 55 | 50 |
| 5 | 6 | 65 | 50 |
| 6 | 9 | 74 | 60 |
| 7 | 4 | 72 | 60 |
| 8 | 4 | 70 | 62 |
| 9 | 30 | 68 | 62 |
| 10 | 4 | 70 | 51 |
| 11 | 4 | 72 | 51 |
| 12 | 180 | 74 | 51 |
| 13 | 10 | 68 | 80 |
| 14 | 10 | 60 | 80 |
| 15 | 10 | 52 | 80 |
| 16 | 10 | 44 | 80 |
| 17 | 10 | 36 | 80 |
| 18 | 10 | 32 | 50 |
| 19 | 10 | 28 | 50 |
| 20 | 10 | 25 | 50 |

The following samples were prepared using durum flour: (1) pasta containing 2 weight percent basil solids using IQF basil; (2) pasta containing 4 weight percent basil solids using a mixture of IQF basil (2 weight percent) and freeze-dried (FD) basil (2 weight percent); and (3) pasta containing 15 weight percent basil using freeze-dried basil. Samples of the 4 weight percent basil-containing pasta were prepared having an acidic pH of 3.6, a neutral pH of 6.7, and an alkaline pH of 9.2. Excellent green color was observed in each of the samples in both the dried and cooked (7 minutes) form. Colorimeter data is presented in Tables X (uncooked dried pasta) and XI (cooked pasta).

TABLE X

Color for Uncooked Dried Pasta

| Basil Solids | Color L | Color a | Color b |
|---|---|---|---|
| 2% IQF | 29.33 | −2.60 | 17.71 |
| 2% IQF/2% FD at pH 9.2 | 23.62 | −1.49 | 9.39 |
| 2% IQF/2% FD at pH 6.7 | 27.51 | −2.45 | 14.10 |
| 2% IQF/2% FD at pH 3.6 | 26.12 | −0.93 | 12.30 |
| 15% FD | 26.02 | −2.06 | 7.21 |

TABLE XI

Color for Cooked Pasta

| Basil Solids | Color L | Color a | Color b |
|---|---|---|---|
| 2% IQF | 46.56 | −5.34 | 17.42 |
| 2% IQF/2% FD at pH 9.2 | 29.30 | −4.08 | 15.30 |
| 2% IQF/2% FD at pH 6.7 | 29.24 | −4.18 | 15.25 |
| 2% IQF/2% FD at pH 3.6 | 33.82 | −3.53 | 16.71 |
| 15% FD | 27.21 | −3.62 | 14.53 |

Color parameters were determined with a Minolta Colorimeter: L is a measurement of the white-gray color component (lightness); a is a measurement of the yellow-blue component (chromaticity); and b is a measurement of the red-green component (chromaticity).

Each basil pasta had good color in the dried and cooked state and good flavor in the cooked state. Pasta prepared using IQF herbs (either alone or combined with freeze-dried herbs) had especially good flavor and color after cooking, with the characteristic flavor notes of fresh basil. Generally, the neutral pH and alkaline pH pastas were superior to the acidic pH pasta; all samples were, however, acceptable. The pastas containing mixtures of IQF and freeze-dried basil and a pH in the range of about 6.7 and 9.2 were considered excellent in both the dried and cooked form in terms of color and flavor.

Example 8. This example illustrates the use of encapsulated tomato solids to prepare a tomato pasta. Dehydrated tomato powder (not less than 93 percent passing through a U.S. Standard No. 30 sieve and not more than 3 percent passing through a U.S. Standard No. 140 sieve) was coated with the following encapsulation composition:

| | |
|---|---|
| Gelatin | 2.0% |
| Alginate | 1.0% |
| Pectin | 1.0% |
| Calcium sulfate | 0.12% |
| Water | 95.88% |

The tomato solids were encapsulated in a fluidized bed coater (Glatt Air Techniques, Model GPCG-5) operated at an inlet air temperature below 60° C. and a product temperature below 50° C. The encapsulating ingredients were solubilized in hot water and slowly applied to the tomato powder in the fluidized bed coater over a two hour period to provide a coated tomato powder having about 6 to 10 weight percent encapsulating material (dry basis). Encapsulated tomato solids were blended with 100 percent durum flour to provide a tomato pasta (upon drying) which contains 6 weight percent tomato solids. The blended mixture was then processed in a conventional extruder (Demaco, single screw type). Formed pasta was then dried using the high temperature and low relative humidity conditions of this invention. Both fresh and dried encapsulated tomato pasta exhibited better characteristics in terms of color and flavor retention upon cooking than similar tomato pasta prepared using unencapsulated tomato solids.

Other encapsulating compositions and/or other vegetable and herb solids can be used in a similar manner to form encapsulated vegetable and herb pastas with excellent color and flavor retention upon cooking. Likewise, other methods for encapsulation can also be used. For example, the vegetable or herb solids could be encapsulated by adding the encapsulation composition to a slurry of the vegetable or herb materials prior to formation of the vegetable or herb solids by spray drying.

That which is claimed is:

1. A method of preparing vegetable or herb pasta containing about 4 to about 15 weight percent vegetable solids or about 2 to 15 weight percent herb solids, said method comprising (1) blending flour, vegetable or herb solids, and water to form a homogenous paste with a water content of about 28 to about 33 weight percent, wherein the flour has a minimum average protein content between about 12 to about 13.5 weight percent;

(2) extruding the homogenous paste to form pasta-shaped extrudates; and (3) drying the pasta-shaped extrudates, whereby a vegetable or herb pasta is obtained with a moisture content of about 11 to about 13 weight percent and vegetable solids content of about 4 to about 15 weight percent or herb solids content of about 2 to 15 weight percent, wherein the drying step comprises (a) drying the pasta-shaped extrudates at a temperature of about 65° to about 85° C. and a relative humidity of about 25 to about 60 percent for a time sufficient to form a partially-dried vegetable or herb pasta with a moisture content of less than about 27 weight percent, and (b) drying the partially-dried vegetable or herb pasta at a temperature of about 75° to about 115° C. and a relative humidity of about 26 to about 60 percent for a time sufficient to dry the vegetable or herb pasta; and wherein the vegetable or herb pasta has, after processing and subsequent cooking, good color, texture, integrity, and vegetable or herb flavor.

2. A method as defined in claim 1, wherein the pasta contains vegetable solids derived from a vegetable selected from the group consisting of beet, broccoli, carrot, celery, corn, green pepper, red pepper, spinach, and tomato.

3. A method as defined in claim 2, wherein the vegetable solids used to form the homogenous paste are in an encapsulated form.

4. A method as defined in claim 2, wherein the pasta is a thin-walled pasta.

5. A method as defined in claim 4, wherein the flour is selected from the group consisting of durum flour, semolina flour, hard red spring flour, and mixtures thereof.

6. A method as defined in claim 4, wherein the pasta contains vegetable solids which in step (1) are in a powder form.

7. A method as defined in claim 4, wherein the pasta contains vegetable solids which in step (1) are in an aqueous slurry form.

8. A method as defined in claim 1, wherein the pasta contains herb solids derived from a herb selected from the group consisting of oregano, basil, coriander, tarragon, onion, parsley, sage, and garlic.

9. A method as defined in claim 8, wherein the pasta is a thin-walled pasta.

10. A method as defined in claim 8, wherein the herb is an individually quick frozen herb present at about 2 to 5 weight percent.

11. A method as defined in claim 8, wherein the herb is a gently-dried herb present at about 4 to 15 weight percent.

12. A method as defined in claim 9, wherein the flour is selected from the group consisting of durum flour, semolina flour, hard red spring flour, and mixtures thereof.

13. A method as defined in claim 8, wherein the herb solids used to form the homogenous paste are in an encapsulated form.

14. A method as defined in claim 1, wherein the flour is selected from the group consisting of durum flour, semolina flour, hard red spring flour, and mixtures thereof.

15. A method as defined in claim 2, wherein the flour comprises a blend of about 50 to about 100 percent by weight durum flour and up to about 50 percent by weight hard red spring flour or a blend of 50 to about 100 percent by weight semolina flour and up to about 50 percent by weight hard red spring flour.

16. A method as defined in claim 1, wherein the pasta contains vegetable solids which in step (1) are in a powder form.

17. A method as defined in claim 1, wherein the pasta contains vegetable solids which in step (1) are in an aqueous slurry form.

18. A method as defined in claim 1, wherein the pasta contains vegetable solids which are derived from a vegetable selected from the group consisting of broccoli, celery, green pepper, and spinach and wherein the pH of the homogenous paste is adjusted from about 5 to about 9.

19. A method as defined in claim 18, wherein the pH of the homogenous paste is adjusted from about 6 to about 8.

20. A method as defined in claim 1, wherein the pasta contains herb solids which are derived from a herb selected from the group consisting of basil, oregano, and coriander and wherein the pH of the homogenous paste is adjusted from about 5 to about 9.

21. A method as defined in claim 20, wherein the pH of the homogenous paste is adjusted from about 6 to about 8.

22. A method as defined in claim 1, wherein the vegetable or herb solids used to form the homogenous paste are in an encapsulated form.

23. A method of preparing a thin-walled vegetable or herb pasta containing about 4 to about 15 weight percent vegetable solids or about 2 to 15 weight percent herb solids, said method comprising (1) blending flour, vegetable or herb solids, and water to form a homogenous paste with a water content of about 28 to about 33 weight percent, wherein the flour is is selected from the group consisting of durum flour, semolina flour, hard red spring flour, and mixtures thereof and has a minimum average protein content between about 12 to about 13.5 weight percent and wherein the vegetable solids are derived from a vegetable selected from the group consisting of beet, broccoli, carrot, celery, corn, green pepper, red pepper, spinach, and tomato or wherein the herb solids are derived from a herb selected from the group consisting of oregano, basil, coriander, tarragon, onion, parsley, sage, and garlic;

(2) extruding the homogenous paste to form thin-walled, pasta-shaped extrudates; and (3) drying the thin-walled, pasta-shaped extrudates, wherein (a) the thin-walled, pasta-shaped extrudates are first dried at a temperature of about 65° to about 85° C. and a relative humidity of about 25 to about 60 percent for a time sufficient to form a first partially-dried, thin-walled vegetable or herb pasta with a moisture content of less than about 27 weight percent, (b) the first partially-dried, thin-walled vegetable or herb pasta is then dried at a temperature of about 75° to about 115° C. and a relative humidity of about 26 to about 60 percent for a time sufficient to form a second partially-dried, thin-walled vegetable or herb pasta with a moisture content of less than about 19.0 weight percent, and (c) the second partially-dried, thin-walled vegetable or herb pasta is dried at a temperature of about 70° to about 98° C. and a relative humidity of about 35 to about 60 percent for a time sufficient to form a thin-walled vegetable or herb pasta with a moisture content of about 11 to about 13 weight percent and vegetable solids content of about 4 to about 15 weight percent or herb solids content of about 2 to about 15 weight percent, wherein the thin-walled vegetable or herb pasta has, after cooking, good color, texture, integrity, and vegetable or herb flavor.

24. A method as defined in claim 23, wherein the vegetable or herb pasta is a vegetable pasta and wherein the vegetable solids in step (1) are in a powder form.

25. A method as defined in claim 23, wherein the vegetable or herb pasta is a vegetable pasta and wherein the vegetable solids in step (1) are in an aqueous slurry form.

26. A method as defined in claim 23, wherein the vegetable or herb pasta is a herb pasta containing about 2 to about 5 weight percent herb solids and wherein the herb solids in step (1) are derived from individually quick frozen herbs.

27. A method as defined in claim 23, wherein the vegetable or herb pasta is a herb pasta containing between about 4 to about 15 weight percent herb solids and wherein the herb solids in step (1) are derived from gently-dried herbs.

28. A method as defined in claim 23, wherein the vegetable or herb solids used to form the homogenous paste are in an encapsulated form.

29. A method as defined in claim 23, wherein the homogenous paste is essentially egg-free.

30. A method as defined in claim 23, wherein the homogenous paste is essentially oil-free.

31. A method as defined in claim 23, wherein the homogenous paste is essentially egg-free and essentially oil-free.

32. A method of preparing vegetable or herb pasta containing about 4 to about 15 weight percent vegetable solids or about 2 to 15 weight percent herb solids, said method comprising (1) blending flour, vegetable or herb solids, and water to form a homogenous paste with a water content of about 28 to about 33 weight percent, wherein the flour has a minimum average protein content between about 12 to about 13.5 weight percent;

(2) extruding the homogenous paste to form pasta-shaped extrudates; and (3) drying the pasta-shaped extrudates, whereby a vegetable or herb pasta is obtained with a moisture content of about 11 to about 13 weight percent and vegetable solids content of about 4 to about 15 weight percent or herb solids content of about 2 to 15 weight percent, wherein the drying step comprises (a) drying the pasta-shaped extrudates at a temperature of about 65° to about 85° C. and a relative humidity of about 25 to about 60 percent for a time sufficient to form a first partially-dried vegetable or herb pasta with a moisture content of less than about 27 weight percent, (b) drying the first partially-dried vegetable or herb pasta at a temperature of about 75° to about 115° C. and a relative humidity of about 26 to about 60 percent for a time sufficient to form a second partially-dried vegetable or herb pasta with a moisture content of less than about 19.0 weight percent, and (c) drying the second partially-dried vegetable or herb pasta at a temperature of about 70° to about 98° C. and a relative humidity of about 35 to about 60 percent for a time sufficient to form the vegetable or herb pasta; and wherein the vegetable or herb pasta has, after processing and subsequent cooking, good color, texture, integrity, and vegetable or herb flavor.

33. A method as defined in claim 32, wherein the pasta contains vegetable solids derived from a vegetable selected from the group consisting of beet, broccoli, carrot, celery, corn, green pepper, red pepper, spinach, and tomato.

34. A method as defined in claim 33, wherein the pasta is a thin-walled pasta.

35. A method as defined in claim 32, wherein the pasta contains herb solids derived from a herb selected from the group consisting of oregano, basil, coriander, tarragon, onion, parsley, sage, and garlic.

36. A method as defined in claim 35, wherein the pasta is a thin-walled pasta.

37. A method as defined in claim 32, wherein the pasta contains vegetable solids which are derived from a vegetable selected from the group consisting of broccoli, celery, green pepper, and spinach and wherein the pH of the homogenous paste is adjusted from about 5 to about 9.

38. A method as defined in claim 37, wherein the pH of the homogenous paste is adjusted from about 6 to about 8.

39. A method as defined in claim 32, wherein the pasta contains herb solids which are derived from a herb selected from the group consisting of basil, oregano, and coriander and wherein the pH of the homogenous paste is adjusted from about 5 to about 9.

40. A method as defined in claim 39, wherein the pH of the homogenous paste is adjusted from about 6 to about 8.

* * * * *